Feb. 22, 1949.  J. R. ERBE ET AL  2,462,171
GENERATOR FED MOTOR CONTROL SYSTEM
Filed July 17, 1946
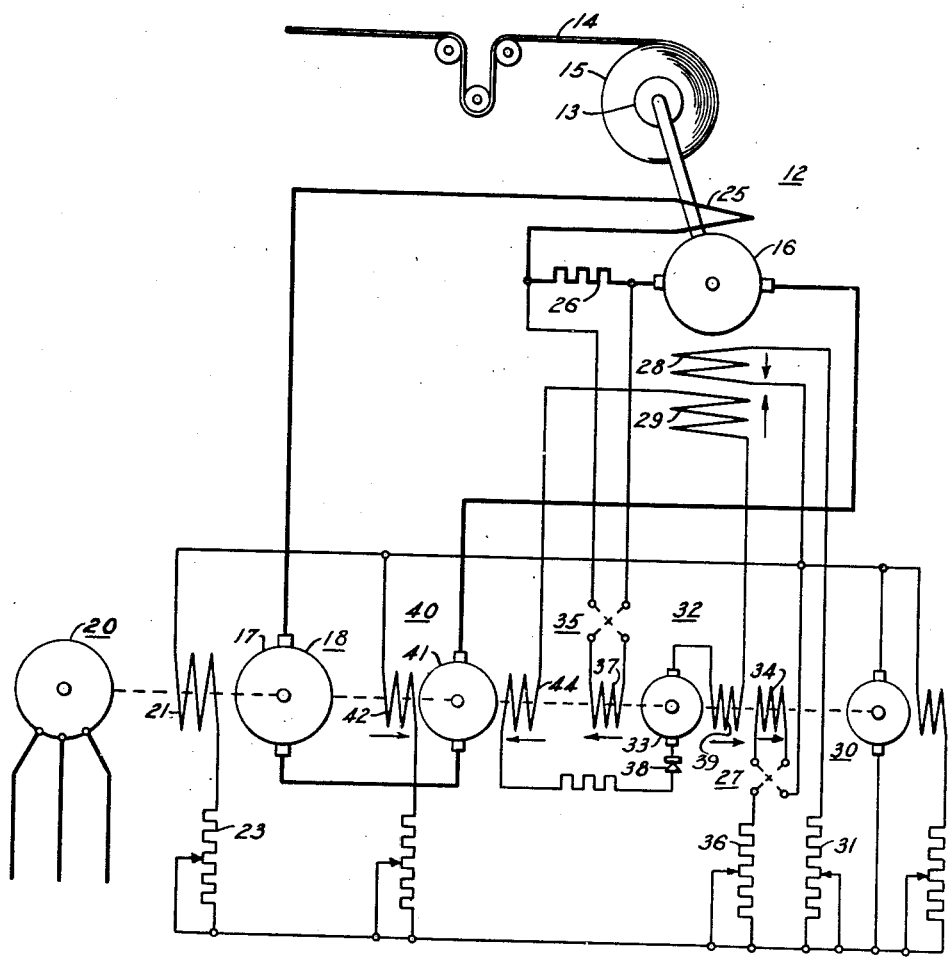
WITNESSES:
INVENTORS
John R. Erbe and
Glenn A. Caldwell.
BY
Paul E. Friedemann
ATTORNEY Patented Feb. 22, 1949

2,462,171

UNITED STATES PATENT OFFICE 2,462,171

GENERATOR FED MOTOR CONTROL SYSTEM

John R. Erbe and Glenn A. Caldwell, Pittsburgh, Pa., assignors to Westinghouse Electric Corporation, East Pittsburgh, Pa., a corporation of Pennsylvania Application July 17, 1946, Serial No. 684,108

9 Claims. (Cl. 318—6)

Our invention relates generally to variable-voltage drives, and more particularly to motor control systems for reel drives.

It is an object of our invention to extend the controllable speed range of a motor considerably beyond that obtainable by either field control or armature voltage control while affording a continuous or smooth speed variation over the entire range and requiring relatively simple and reliable control means for securing the desired performance.

Another object of our invention, subsidiary to the foregoing, is to provide an extended speed range for a reel motor in both winding directions, so as to permit a greater coil build-up while maintaining a predetermined tension on the material during coiling as well as uncoiling operation.

It is also an object of our invention to provide for varying the speed of a reel motor as the amount of material wound on the reel changes, by varying the armature voltage and the field excitation, so as to maintain both a predetermined tension on the material and a substantially constant speed of travel of the material.

Other objects will in part be obvious, and will in part be explained hereinafter.

According to one of the features of our invention, a control generator of reversible voltage is connected in series with the armature of the drive motor and in series with a main source of adjustable voltage so that the resultant voltage impressed on the motor armature is the sum or difference of the two voltages depending upon whether the control generator is operating in boosting or bucking relation to the voltage from the main source. The drive motor and the control generator have respective field circuits excited under control by a regulating generator whose output voltage varies in response to the armature current of the reel motor. The control of the field circuits by the regulating generator is such that when the regulating output voltage changes continuously in one sense, for instance when this output voltage increases with the building-up of the coil on the reel, the motor field is progressively changed, for instance, strengthened to reduce the motor speed, while the field excitation of the control generator is reversed so as to progressively change the resultant motor armature voltage in the same speed-changing sense under maintenance of a substantially constant motor armature current.

These and other objects and features of the invention will be apparent from the following description in connection with the accompanying drawing in which the single figure is a diagrammatic view of a reel drive system embodying the invention in one of its forms.

According to the drawing, a reel motor 12 is connected in driving relation with a reel 13 for winding a strip of material 14 to form a coil 15.

The reel motor 12 has an armature 16 connected in circuit with the armature 17 of a variable voltage generator 18 which is driven by means of a motor 20, and provided with a field winding 21. The circuit of winding 21 includes suitable control means for varying the field excitation, such control means being represented by the field rheostat 23. The reel motor 12 is shown to be provided wtih a commutating winding 25 connected in series with its armature through a resistor 26 or other suitable device to provide a control voltage which is proportional to the armature or load current of the motor. The main field means of reel motor 12 comprise two field windings 28 and 29. The field winding 28 is energized from a direct-current source, such as the exciter 30, through a control rheostat 31.

A regulator means is provided for maintaining a predetermined tension on the strip 14 as the diameter of the coil on the reel 13 gradually increases. In the illustrated example, the regulating means consist essentially in a regulating generator whose armature 33 (output circuit) is connected in series with the field winding 29 for controlling the energization thereof.

The regulating generator has a pattern field winding 34 energized from a suitable source of control voltage, such as the exciter 30. A reversing switch 35 may be provided for reversing the connections of the pattern field winding to the exciter 30. A rheostat 36 serves to adjust the energization of the pattern field winding in accordance with a desired winding tension.

The regulating generator has also a control circuit wtih a control field winding 37 energized in accordance with the armature or load current of the reel motor 12. For example, the field winding 37 is connected across the resistor 26. Winding 37 is differential with respect to the pattern field winding 34, and tends to increase the output voltage of the regulating generator when the armature current of the reel motor increases. A switch 27 may be provided for reversing the connections of the winding 37. Pattern field winding and control field winding balance each other when the armature or load current of the reel motor 12 is of such a value as to produce the desired tension in the strip 14. A rectifier device 38 may be connected in circuit with the armature 33 to prevent the pattern field winding from reversing the output voltage of the regulating generator at low levels of operation.

The regulating generator 32 may also be provided with a self-energizing field winding 39, here shown in series connection with the armature 33, whose resistance line approximately coincides with the unsaturated portion of the no-load magnetization characteristic or air-gap line of the generator 32 so that the self-energizing winding 39 provides most of the field excitation needed to maintain the output voltage of the regulating generator at any particular value which may have been reached in correcting an unbalanced condition.

In order to extend the speed range of the reel motor 12, a control generator 40 has its armature 41 connected in series with the armature 16 of the reel motor and the armature 17 of the variable voltage generator 18. The control generator 40 has a field winding 42 energized by normally constant voltage, for instance, from the exciter 30 for producing the initial or base field excitation in such a direction that the voltage of generator 40 is additive to the voltage of generator 18.

The control generator has a control field winding 44 connected in series with the armature 33 of regulating generator 32 and with the field winding 29 of the reel motor. The two field windings 42 and 44, or their respective circuits are differentially related to each other and balanceable against each other.

Automatic control of the tension in the strip of material 14 which is being wound on the reel 13 is maintained by the regulating generator 32, whose pattern field winding 34 is continuously excited from the exciter 30. Since the control field winding 37 is connected across the resistor 26 in the armature circuit of the reel motor 12, any change of torque, as the diameter of the coil on the reel 13 increases while winding the strip, will be reflected by increased energization of the control winding 37. This increases the output of the regulating generator 32, thus increasing the energization of the field windings 44 and 29 of the control generator 40 and the reel motor 12, respectively. Increased excitation of the field winding 29 of the reel motor results in a reduction in the reel motor speed, and restores the tension of the strip to the predetermined value. Should the tension decrease, the reduced armature current resulting therefrom causes a weakening of the net motor field excitation, which increases the motor speed and restores the tension.

At the start of a winding operation, the diameter of the coil on the reel 13 is at a minimum, as is the output voltage of the regulating generator 32. Under this condition, the energization of the field winding 29 of the motor is at a minimum and the motor speed is at a maximum. The field winding 42 of the control generator predominates, and the output of the control generator is in such a direction as to increase the voltage across the armature 16 of the reel motor, thus producing the maximum motor speed. As the diameter of the coil on the reel 13 increases, the energization of the control field winding 37 tends to increase, and the regulating generator 32 in maintaining a predetermined value of armature current, gradually increases its output voltage which is maintained by the self-energizing field winding 39, so as to maintain the proper balance between the pattern and the control field winding to keep the tension on the strip 14 constant. As this output voltage increases, the control field winding 44 of the control generator 40 becomes more effective, gradually neutralizing the effect of the field winding 42, and eventually becoming predominant. This results in a gradual reduction of the voltage of the control generator with an eventual reversal thereof as the coil diameter increases, thus reducing the net voltage across the armature of the reel motor 12, and reducing the speed thereof to maintain constant strip speed. At the same time the energization of the motor field winding 29 increases, further reducing the motor speed.

Our invention may also be used to extend the operating range of the motor 12 when the reel 13 is used in an uncoiling operation. For this operation the reversing switches 27 and 35 are operated to reverse the polarities of the pattern and control field windings 34 and 37 so that the control field acts to reduce the energization of the motor field winding 29 whenever the tension in the strip 14 increases above the predetermined value.

In an uncoiling operation the diameter of the coil is a maximum at the start of the operation so that the motor 12 is at first operating at minimum field. The output of the regulating generator is then a maximum as determined by the pattern field winding 34.

As the diameter of the coil decreases, the tension in the strip 14 increases. The corresponding increase in the armature current and in the energization of the control field winding 37, reduces the output of the regulating generator 32. This reduces the net field excitation of the motor 12, so that it speeds up and reduces the tension in the strip to the predetermined value.

The motor 12 has to run faster and faster to maintain the desired strip speed, as the reel unwinds. Since the output of the control generator 32 decreases from a maximum to a minimum during an uncoiling operation, the energization of the control generator field winding 44 changes correspondingly. Therefore, the net voltage across the motor armature 16 varies from a minimum to a maximum, as the output voltage of the control generator changes from buck to boost. Accordingly, the speed range of the motor 12 is extended over that possible by field control only.

From the above description and the accompanying drawing, it will be apparent that we have provided a simple and effective system for controlling the speed of a reel motor, whereby its speed of operation may be extended over a far wider range than is possible by field control alone. We have provided a simpler and much less expensive method than is possible when driving the reel by a separate variable voltage drive which has a greater range of voltage control than the main drive system. Our invention may also be used to extend the speed range of a reel motor during uncoiling operation merely by reversing the polarities of the control and pattern field windings of the regulating generator.

It will be obvious to those skilled in the art that various changes may be made in the above described construction, and different embodiments of the invention may be made without departing from the spirit or scope thereof, and without departing from the features of the invention set forth in the annexed claims.

We claim as our invention:

1. A reel drive system comprising, a reel motor having an armature and a plurality of field windings, circuit means connecting the armature to a principal source of electrical energy, a control generator having an armature connected in circuit relation with the motor armature and the principal source and having a plurality of field windings, circuit means connecting one field winding of each the motor and the control generator to a substantially constant voltage source, a regulating generator having an armature connected in circuit with another field winding of each the control generator and the motor and having a plurality of field windings, circuit means connecting one of the field windings to be energized in accordance with the armature current of the motor, and additional circuit means so connecting another field winding of the control generator to a control source in opposition to said one field winding as to effectively neutralize said one winding under predetermined conditions of armature current.

2. In a reel system, a reel motor having an armature and a plurality of field windings, circuit means connecting the armature to a variable voltage source, a control generator having an armature connected in series circuit relation with the motor armature and the variable voltage source and having a plurality of field windings, a regulating generator having an armature connected in circuit with one of the motor field windings and one of the control generator field windings and having a plurality of field windings, circuit means connecting one of the field windings of the regulating generator to a source of substantially constant voltage, circuit means connected to effect energization of another of the field windings of the regulating generator in accordance with the armature current of the reel motor and in opposition to the said one field winding of the regulating generator so as to substantially balance said one field winding for a predetermined value of motor torque, and circuit means connecting another of the control generator field windings to a source of substantially constant voltage that the voltage of the control generator gradually reduces the voltage across the motor armature as the reel is filled.

3. In combination, a motor having an armature circuit and two field windings, circuit means connecting one of the field windings to a source of substantially constant voltage, circuit means connecting the armature circuit to a source of electrical energy, a control generator having an armature series-connected in said armature circuit and a pair of mutually differential field windings, a regulating generator having an armature for providing variable voltages and having control field means connected to said armature circuit for controlling said variable voltages in response to the armature current of said motor, said armature of said regulating generator being connected to one of the motor field windings and one of the control generator field windings for exciting them by said variable voltages, and current supply means of normally constant voltage connected to said other field winding of said control generator.

4. In combination, a reel motor having an armature circuit and a pair of field windings, circuit means connected to one of said field windings to provide normally constant voltage therefor, a main generator of adjustable voltage connected in said armature circuit, a control generator of reversible voltage having an armature connected in series with said main generator in said armature circuit, said control generator having two mutually differential control field windings, circuit means connected to one of said control field windings for providing it with normally constant voltage, and regulating means having an output circuit for providing variable voltage and having a control circuit connected to said armature circuit for controlling said variable voltage in response to the armature current of the motor, said regulator output circuit being connected to said other field winding of said motor and control generator respectively for simultaneously causing them to cumulatively control the motor speed.

5. In combination, a motor having an armature circuit and a field circuit, adjustable current supply means connected to said armature circuit to supply adjustable voltage thereto, a buck and boost generator having an armature series-connected in said armature circuit and having field means comprising two differentially interrelated field control circuits to reversibly control the voltage of said generator, current supply means of normally constant voltage connected to one of said field control circuits, and regulating means having an output circuit for providing variable voltage and having a control circuit connected to said armature circuit for controlling said variable voltage in response to the armature current of the motor, said regulator output circuit being connected to said motor field circuit and to said other field control circuit for simultaneously causing them to cumulatively control the motor speed.

6. A drive system, comprising a drive motor of voltage-responsive speed having an armature circuit, a main generator of adjustable voltage and a control generator of reversible voltage series-connected with each other in said armature circuit to provide for said motor a resultant armature voltage variable between the sum and the difference of said adjustable and reversible voltages, said control generator having field means disposed for controlling said reversible voltage and having two mutually differential and balanceable field control circuits, current supply means of normally constant voltage connected to one of said control circuits, and regulating means connected to said other control circuit to provide variable voltage therefor and connected to said armature circuit for controlling said variable voltage in response to the motor current, said constant voltage being rated so that said two control circuits balance each other and cause said reversible voltage to change its polarity at a medium motor speed.

7. A drive system, comprising a drive motor having an armature circuit and a field circuit, a main generator of adjustable voltage and a control generator of reversible voltage series-connected with each other in said armature circuit to provide for said motor a resultant armature voltage variable between the sum and the difference of said adjustable and reversible voltages, said control generator having field means disposed for controlling said reversible voltage and having two mutually differential and balanceable field control circuits, current supply means of normally constant voltage connected to one of said control circuits, and regulating means connected at the output side to said motor field circuit and to said other control circuit to provide variable voltage therefor and connected at the input side to said armature circuit for controlling said variable voltage in response to the motor current, the polarity of the output side connections of said regulating means being such as to decrease the motor field excitation at increasing values of said resultant armature voltage.

8. A drive system, comprising a drive motor having an armature circuit and a field circuit, voltage-adjustable direct-current circuit means and a control generator series-connected with each other in said armature circuit to provide for said motor a resultant armature voltage variable between the sum and the difference of said adjustable and reversible voltages, said control generator having field means disposed for controlling said reversible voltage and having two mutually differential and balanceable field control circuits, current supply means of normally constant voltage connected to one of said control circuits, and a regulating generator having an armature connected to said motor field circuit and to said other control circuit to provide variable voltage therefor and having field control means with two mutually differential and balanceable field control circuits of which one is connected to said armature circuit to be excited in dependence upon the current flowing in said armature circuit, and voltage-adjustable circuit means attached to said other control circuit of said regulating generator for providing normally constant reference voltage therefor, the polarity of connections of said armature of said regulating generator being such as to weaken the motor field with increasing values of motor armature voltage.

9. A core-type reel drive, comprising a reel motor having a field circuit and an armature circuit including a series-connected resistance means, a main generator of adjustable voltage and a control generator in said armature circuit to provide for said motor a resultant armature voltage variable between the sum and the difference of said adjustable and reversible voltages, said control generator having field means disposed for controlling said reversible voltage and having two mutually differential and balanceable field control circuits, current supply means of normally constant voltage connected to one of said control circuits, and a regulating generator having an armature connected to said motor field circuit and to said other control circuit to provide variable voltage therefor and having field control means with two mutually differential and balanceable field control circuits of which one is connected to said resistance means to be excited in dependence upon the armature current of said motor and voltage-adjustable circuit means attached to said other control circuit of said regulating generator for providing normally constant reference voltage therefor, the polarity of connections of said armature of said regulating generator being such as to weaken the motor field with increasing values of motor armature voltage.

JOHN R. ERBE.
GLENN A. CALDWELL.

REFERENCES CITED

The following references are of record in the file of this patent:

UNITED STATES PATENTS

| Number | Name | Date |
| --- | --- | --- |
| 2,333,978 | Bowman | Nov. 9, 1943 |